June 23, 1936. K. MOHR 2,045,196
FUEL INJECTING PUMP FOR INTERNAL COMBUSTION ENGINES
Filed Oct. 18, 1935
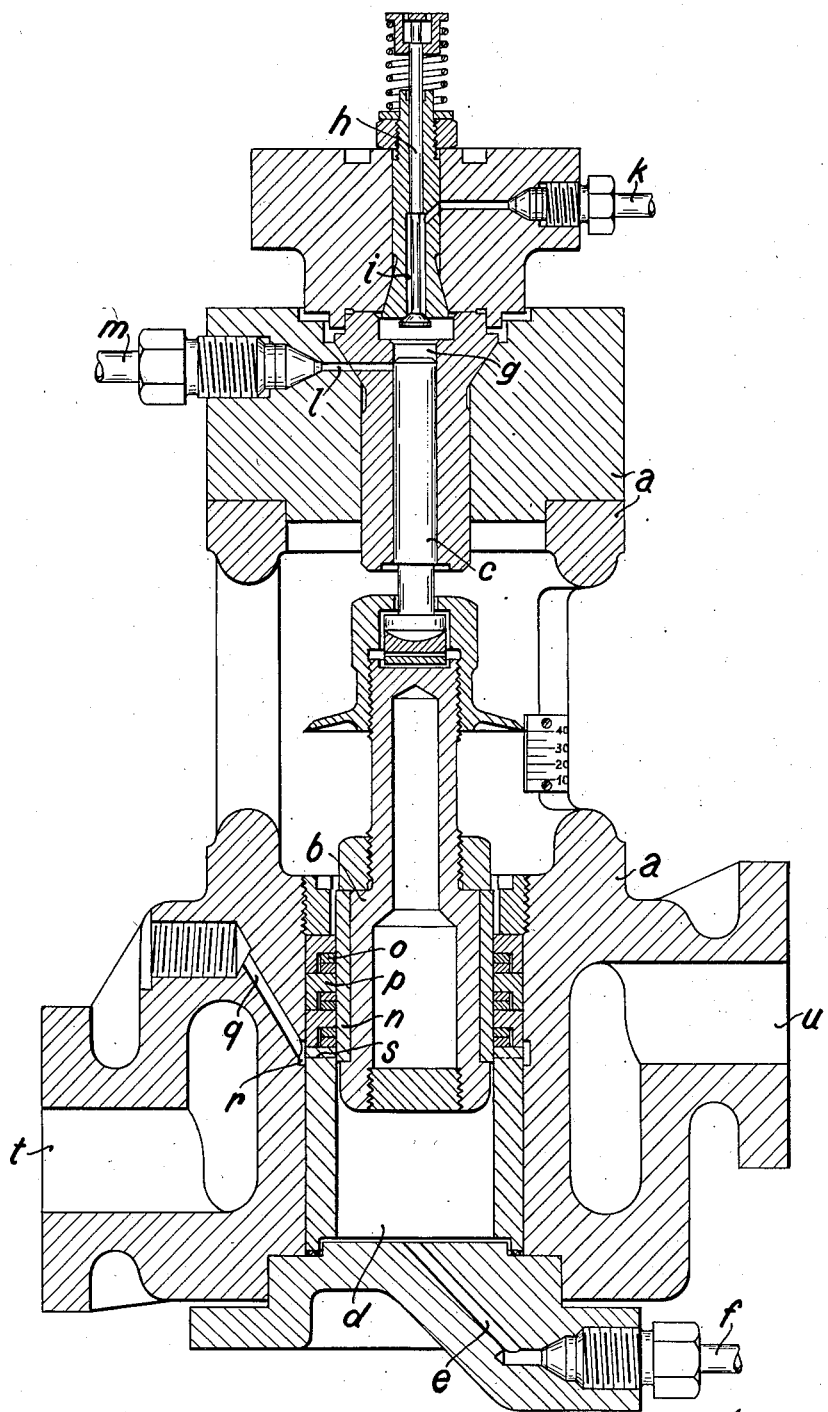

UNITED STATES PATENT OFFICE 2,045,196

FUEL-INJECTING PUMP FOR INTERNAL COMBUSTION ENGINES

Karl Mohr, Kiel, Germany, assignor to Fried. Krupp Germaniawerft Aktiengesellschaft, Kiel-Gaarden, Germany Application October 18, 1935, Serial No. 45,675
In Germany October 27, 1934

3 Claims. (Cl. 103—50)

The invention relates to fuel-injecting pumps for internal combustion engines and has more particularly reference to the arrangement of the piston rings of such pumps, in which the fuel is injected by means of a differential piston by the compression pressure produced in the working cylinder of the internal combustion engine. Hitherto the usual outwardly pressing piston rings have been made use of for the piston part serving as air piston. It has been found, however, with these differential pistons that that part of the piston surface which is situated below the piston rings is lubricated only insufficiently, or not at all, and that, consequently, a heavy wear of the sliding surfaces of the pistons and of the cylinder liner is to be observed.

The present invention has for its object to overcome this drawback, which object is achieved by setting the piston rings in annular grooves provided in the cylinder liner surrounding the piston, so that they embrace the smooth cylindrical surface of the piston by inwardly directed spring action.

Inwardly pressing piston rings are known in themselves and have already been provided with the working pistons of internal combustion engines. Here they have been provided, however, for quite definite constructional reasons, for example, in order to render possible the provision of a scavenging arrangement for the piston rings or for suitable re-adjusting of the piston rings. In principle, however, the arrangement of inwardly pressing piston rings on working pistons affords no advantage, but, in the contrary, entails serious disadvantages. So, for instance, the working pistons become unusually long and correspondingly expensive, because their sliding surfaces must be at least by the whole piston stroke longer than the portion on which the piston rings are distributed on the cylinder wall. Furthermore, the protection of the sliding surfaces of the piston and cylinder from the hot gases of combustion is impossible, because the uppermost piston ring is near the piston head only in the lower dead centre position, whilst in all other piston positions, in particular during the process of combustion, a considerable section of the sliding surfaces is situated above the piston rings and thus is entirely without protection.

The invention starts from the perception, that the mode of operation of the injecting pumps mentioned above differs from that of working pistons. For, whilst with a piston connected to a crank drive the mode of motion is the same during both strokes, this is not the case with a freely movable pump piston which, in general, makes its filling stroke under the action of the fuel supplied to the pump space under pressure, but on its injecting stroke is actuated by the compression pressure transmitted from the working cylinder. If outwardly pressing piston rings are used, the distribution of the lubricant is influenced thereby in such a manner, that on the filling stroke of the differential piston the rings together with the piston uniformly and comparatively slowly slide over the lubricant film adhering to the cylinder wall. On the pressure stroke of the differential piston, however, at first only a slight motion takes place, until the fuel has been brought to the pressure required for the injection. Thereupon the piston is suddenly raised due to the compression pressure which in the meantime has become very high and which further increases as soon as the first ignition takes place. On this rapid motion of the piston the piston rings carry away the lubricant film from the cylinder wall and take with them the lubricant up to the outer dead centre position of the piston. Since, further, the air pressure acting from below prevents the lubricant from squeezing through in the opposite direction between the piston rings and the cylinder wall, the whole lubricant collects above and between the piston rings, whilst the sliding surfaces below the rings are not lubricated satisfactorily.

In order that the invention may be clearly understood and readily carried into effect, an embodiment of the same is illustrated by way of example in the accompanying drawing which shows a fuel injecting device according to the invention in vertical section.

Referring to this drawing, $a$ denotes the casing of the device. The casing consists of several parts and has lodged in it a differential piston consisting of an air piston $b$ of large diameter and a pump piston $c$ of small diameter. The space $d$ existing below the end face of the air piston $b$ communicates with the compression chamber of the working cylinder, through a passage $e$ and a pipe $f$ attached thereto. $g$ denotes the pump space into which opens both a passage $i$ governed by the fuel inlet valve $h$ to which leads a feed conduit $k$ coming from the feed pump (not shown), and a passage $l$ which, through the pressure conduit $m$, is connected to the fuel injecting valve (not shown). The directions of flow of the respective agents through the pipes $f$, $k$ and $m$ are indicated by arrows.

In order to enable easy replacement of the sliding surface of the air piston $b$, this surface is formed by a liner $n$. The inwardly pressing piston rings $o$ are embraced externally and on the sides by superposed chamber rings $p$ of angular cross section. In order to supply lubricant, a passage $q$ is provided which, close below the piston rings $o, o$, opens into an annular space $r$ from which a plurality of radial bores $s$ lead up to the sliding surface of the piston. $t$ and $u$ denote the flanged sockets serving to supply and draw off the cooling water for the air piston cylinder.

The described arrangement of piston rings has the effect, that the lubricant on the downward stroke of the differential piston is distributed as a thin film on the entire piston surface sliding past the point of supply. In addition, also on the subsequent upward stroke the lubricant which adheres as a thin film to the smooth piston wall, which is not interrupted by grooves, is led past the piston rings to the sliding surface situated above the latter. The reason for this is, that the lubricant film adheres to the surface of the piston, which is not so directly exposed to the hot gases as the surface of the cylinder is and, therefore, better maintains the lubricant film. The air pressure acting from below further favors this distribution. On both strokes of the piston the sliding surfaces of the cylinder and of the piston thus are uniformly and satisfactorily lubricated on all parts and also the piston rings themselves are continuously lubricated in a satisfactory manner.

What I claim and desire to secure by Letters Patent is:—

1. A fuel injecting pump for internal combustion engines comprising a casing, two cylindrical spaces formed therein and having different sectional area, a differential piston cooperable with said two cylindrical spaces and freely movable therein, means cooperable with the smaller piston part and cylinder for supplying fuel to, and leading it from, the latter to the working cylinder of the engine, means cooperable with the larger piston part and cylinder for causing the compression pressure occurring in the working cylinder of the engine to act upon said larger piston part, said larger piston part having a smooth sliding surface and said larger cylinder having circular grooves and inwardly pressing packing rings lodged therein and cooperable with said smooth sliding piston surface.

2. A fuel injecting pump as specified in claim 1 in which said larger cylinder is fitted with a liner carrying said circular grooves and packing rings lodged therein.

3. A fuel injecting pump as specified in claim 1 in which said larger piston part is fitted with a liner the outer surface of which forms said smooth sliding surface.

KARL MOHR.